F. HANSON.
CAMP COOKER.
APPLICATION FILED JUNE 6, 1917.

1,266,588.

Patented May 21, 1918.
2 SHEETS—SHEET 1.

INVENTOR
Frank Hanson

J. C. Ledbetter
ATTORNEY

F. HANSON.
CAMP COOKER.
APPLICATION FILED JUNE 6, 1917.

1,266,588.

Patented May 21, 1918.
2 SHEETS—SHEET 2.

INVENTOR
Frank Hanson.

ATTORNEY

UNITED STATES PATENT OFFICE.

FRANK HANSON, OF DALLAS, TEXAS.

CAMP-COOKER.

1,266,588.        Specification of Letters Patent.        Patented May 21, 1918.

Application filed June 6, 1917. Serial No. 173,221.

*To all whom it may concern:*

Be it known that I, FRANK HANSON, a citizen of the United States of America, residing at Dallas, in the county of Dallas and State of Texas, have invented a new and useful Improvement in Camp-Cookers, of which the following is a specification.

This invention relates to a new and useful improvement in a form of camp cooker, or camp stove and particularly appertains to a folding and demountable cooker. The purpose of the invention is to provide a camp cooker which will be foldable in design and be provided with means for cooking foods in any of the ways best recognized in cooking and preparing them, such as frying, stewing, baking or broiling. It is a purpose to provide a form of demountable supporting rack which will comprise a partly inclosed frame adapted to support cooking and baking vessels and a coffee pot.

Figure 1:
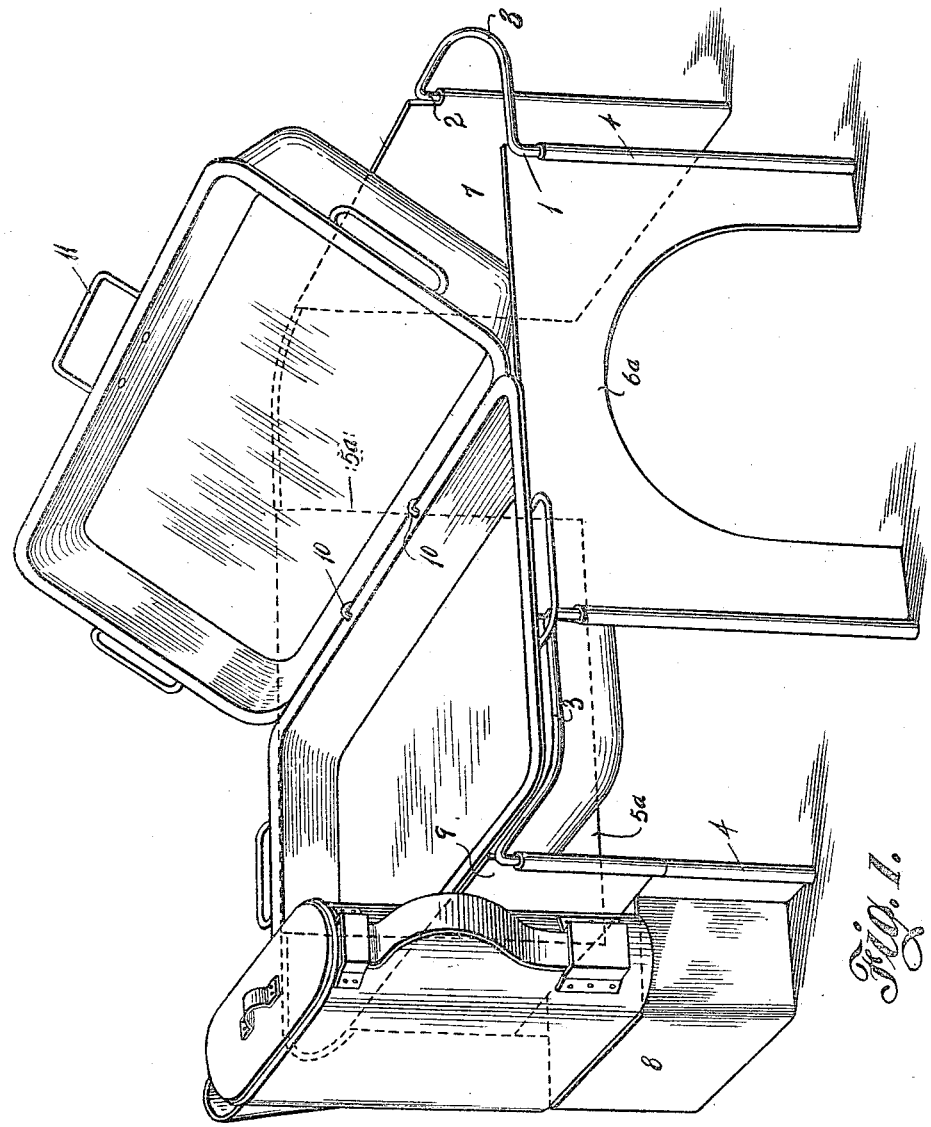

With the above and other objects in view the invention has relation to a certain combination and arrangement of parts, an example of which is described in the following specification pointed out in the appended claim and illustrated in the accompanying drawings; wherein, Figure 1 illustrates the camp cooker in perspective view shown in connection with forms of cooking utensils.

Figure 2:
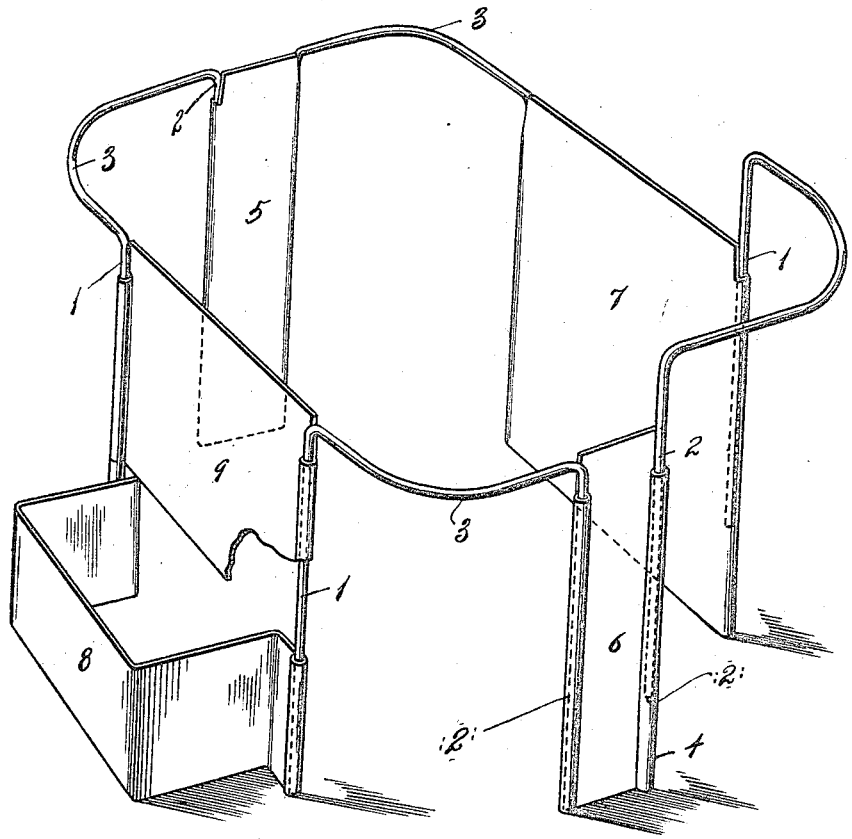

Fig. 2 illustrates the retaining or supporting frame of the device and the principal form of the cooking apparatus.

Figure 3:
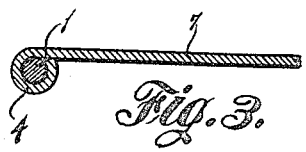

Fig. 3 illustrates a cross sectional view of one of the sides with integral loop or curl formed thereon and adapted to receive a support rod.

Referring now more in particular to the drawings wherein the several parts are identified throughout by identical reference characters, the numerals 1 and 2 point out the several support rods or stands used in assembling this device. The standards, or legs 1 and 2 are arranged vertically parallel and integrally connected by a horizontal curved member 3, which forms the corner of this camp cooker. The several sets provided, as shown in the illustrations, have a design identical one with the other such that they are interchangeable which makes the device easy and convenient to assemble. Each one of the vertical support members or legs of the several sets of retaining frames are passed into loops or curls 4, integrally formed on the inclosing sides and confined therein during the use of the device.

Referring to Fig. 2 of the drawings, the companion side frames 5 and 6 are provided and receive the legs of the support stands in the eye or curl formed integral therewith. The retaining frame or support rods may be easily slipped into the eyes or curl of the side members, and in this figure one of the retaining frames is shown partly withdrawn from its correlated side members for rendering comprehensible the manner of assembling the device. The structure as shown assembled in Fig. 2 is of appropriate size to receive a single pan, while the assembly shown set up in Fig. 1 is the size adapted to receive a double pan arrangement. This expanded size of the device permits the use of the two cooking pans side by side and exposes both pans to the heat of the fire and will be used in preparing meals for a greater number of persons, while the device shown in Fig. 2 is contracted in size and gives a minimum cooking capacity.

It is a particular purpose of this invention to provide expeditious means for making the change from the small size cooker to the large size device.

The members $5^a$ and $6^a$ are taken as companion members with the sides 5 and 6, the parts 5 and 6 being used in the assembly where a single pan supporting structure is desired and the parts $5^a$ and $6^a$ being used where a double pan retaining frame is necessary. A side plate 7 is used in each structure. Means are provided for supporting a coffee pot or similar form of vessel, which means comprises a supporting plate 8 set out from the side of the device. It is provided with vertical sides and a similar form of loop or curl for receiving and fixing to the legs of the retaining frames. This member 8 gives adequate supporting means and surface for an appropriate form of coffee pot. A vertical plate member 9, with similar form of receiving loop is included and confined on the same standards which retain the member 8. This plate 9 excludes the fire and smoke from the side of the coffee pot and directs the heat from the member 8, causing a maximum heat to be directed against the bottom of the cooking vessel supported thereupon.

The member 6ª will preferably have a cut away design as shown, which will permit the placing of fuel into the frame. With the device assembled in either form it will form a substantial retaining frame for a single or double pan and adequate means for cooking coffee, as illustrated. The whole equipment has such an appropriate design as will readily permit all parts of the device to be placed within the cooking pans. The two half sections of the large pans will be folded together about their hinges 10, and conveniently carried by the handle 11. The loop hinge 10, is formed by a light rod or wire and may be removed to facilitate dismantling.

In designing this form of cooker, or outdoor cook stove, due care is had for the transportation of same, and the present invention discloses a folding cooking kit comprising the parts herein illustrated, along with any parts not shown, such as plates, knives, forks and cups, many of which may be placed in the coffee pot and the whole number then arranged in the double pan along with the retaining frame in its knocked down condition.

The invention is presented to include all such changes and modifications in design and form as may be adjudged to come within the meaning of the following claim.

Claim:

In a camp cooker, the combination with a plurality of support standards, side plates arranged in connection with the support standards to form an inclosure the said plates extending from the top end of the supports to the ground, one side plate arranged in a supported position between two standards and having its lower edge spaced away from the ground to permit heat from the interior of the inclosure to pass under the last named plate, and a pot or pan supporting rack comprising a vertical housing with an open side disposed beneath the last named plate.

In testimony whereof I hereunto affix my signature.

FRANK HANSON.

Copies of this patent may be obtained for five cents each, by addressing the "Commissioner of Patents, Washington, D. C."